Patented Dec. 27, 1949

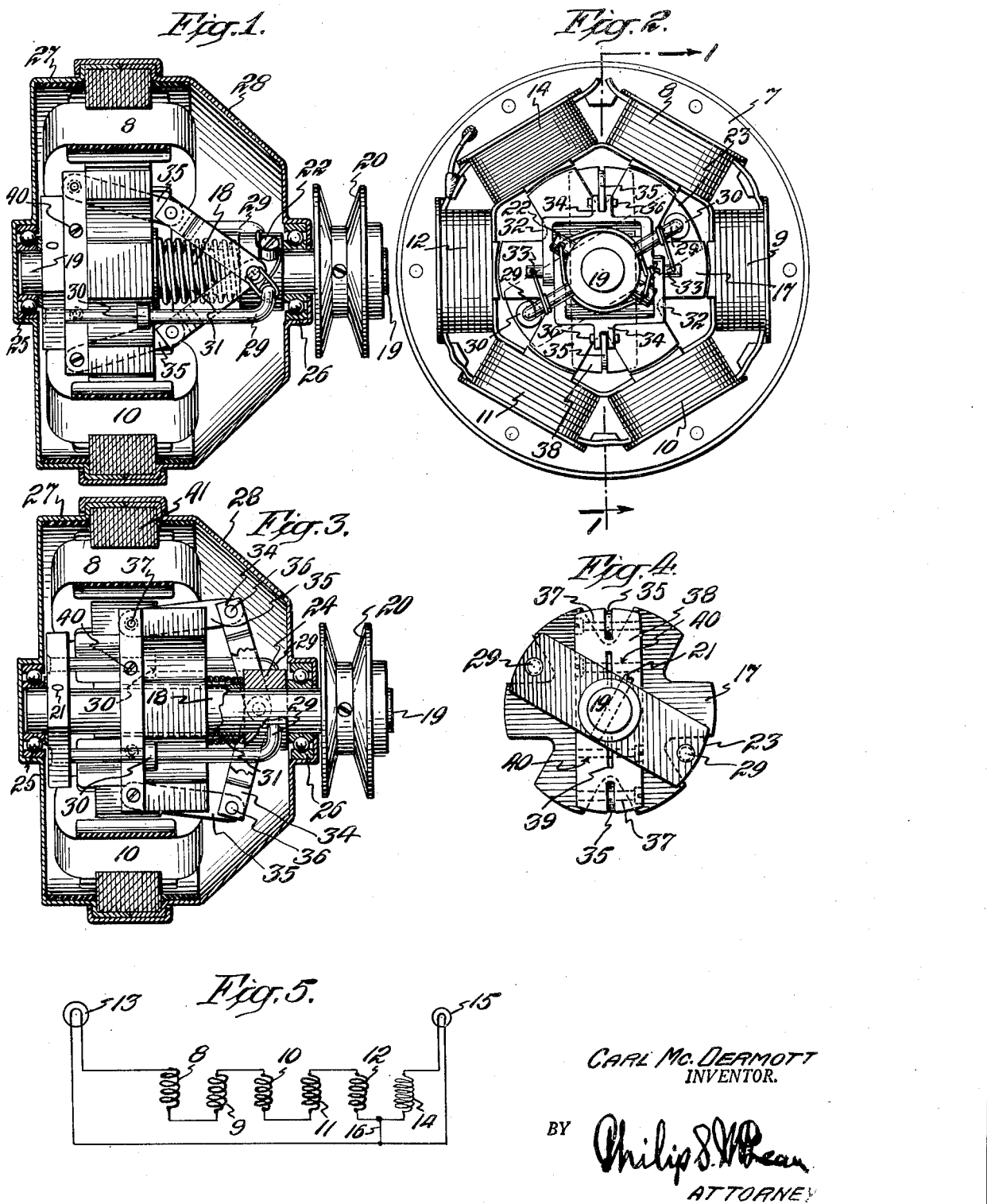

2,492,810

UNITED STATES PATENT OFFICE 2,492,810

ELECTRIC LIGHT GENERATOR FOR MOTOR SCOOTERS AND THE LIKE

Carl McDermott, Freehold, N. J.

Application August 2, 1948, Serial No. 41,957

2 Claims. (Cl. 171—209)

1

The invention here disclosed relates to electric generators and the general purposes of the invention are to provide a light weight, small size generator suitable for furnishing current to the head and tail lights used on "motor scooters" and like vehicles.

Particularly it is a purpose of the invention to provide a generator which will maintain substantially constant voltage over a wide range of speed.

Further special objects of the invention are to provide a generator of simple, electrical and mechanical construction, thoroughly reliable and efficient, capable of standing rough usage and arranged in a simple electric system to furnish at the same voltage, the greater amperage for the higher candle power head lights and the lesser amperage for the lower candle power tail light.

Other desirable objects attained by the invention are set forth or will appear in the course of the following specification.

The drawing accompanying and forming part of the specification illustrates a present practical embodiment of the invention. Actual structure, however, may be modified and changed, all within the true intent and broad scope of the invention as hereinafter defined and claimed.

Fig. 1 in the drawing is a vertical sectional view of the generator in the idle or starting position with the shiftable armature or rotor fully in the field.

Fig. 2 is an end view showing the parts as they appear with half the casing removed.

Fig. 3 is a broken sectional view similar to Fig. 1 showing the rotor as shifted by the centrifugal governor to the full limit of its movement out of the center of the field.

Fig. 4 is an end view of the rotor and shaft structure.

Fig. 5 is a wiring diagram.

The embodiment of the invention illustrated comprises a six-pole laminated stator 7 having five series connected coils 8, 9, 10, 11, 12 for furnishing current to the head lights 13, Fig. 5, and a sixth coil 14 for furnishing current to the tail light 15. As shown in the wiring diagram, a tap 16 between the fifth and sixth coils furnishes the connection for transmitting current from the five coils in one direction to the head lights and current from the last, single coil 14 to the tail light.

The rotor 17 is shown as a permanent six-pole magnet of laminated form fixed on a sleeve 18 slidable on the shaft 19. This shaft is shown equipped with a pulley 20 to be driven from the

2 engine of the motor scooter or vehicle on which the generator is used.

Fixed on the shaft at opposite sides of the rotor, as by means of pins or other fastenings 21, 22 is a cross bar 23 and a collar 24. These may be so located as to constitute abutments engageable with the ball bearings 25, 26 carried by the opposed halves or sections 27, 28 of the casing.

Drive rods 29 are shown extending from the cross bar 23 to the collar 24 through interpolar spaces in the rotor. These rods are shown as carrying discs 30 of slightly less diameter than the spaces between the rotor poles to constitute loose non-binding drive connections for the rotor.

A spring is shown at 31 interposed between the collar 22 and the opposing face of the rotor for yieldingly holding the rotor in the centered position in the field shown in Fig. 1.

The centrifugal governor for sliding the rotor from directly under the pole pieces comprises a pair of similar U-shaped yoke levers 32 pivoted at their open ends on pins 33 projecting from the collar 22 and having off-center lugs 34 projecting from their closed ends and split to receive the ends of links 35 pivoted thereto at 36 and pivoted at their opposite ends at 37, in end portions of a bar 38 at the back of the rotor.

The bar 38 is bored to fit over the end of the rotor sleeve 18 and is shown in Fig. 4 as split in its central portion at 39 so that it may be clamped upon the sleeve by through screws 40.

Fig. 2 shows how the yokes 32 which act as the governor weights and levers may be engaged upon the pivot studs 33 with the arms of the same in alternating order, thus to locate the offset hinge lugs 34 in centered relation so as to apply direct straight line pull to the rotor sleeve. With this arrangement the yokes may be made exactly alike, care being taken to assemble them in the right relation to bring the offset hinge lugs into line with the diameter of the shaft.

The shaft and rotor constitute a unit assembly which can be mounted in the casing, before the pulley is applied, by entering one end of the shaft in the ball bearing carried in one portion of the casing and the other end of the shaft in the bearing carried by the other section of the casing, the two portions of the casing then being connected together as by means of an encircling band 41 which may be of split construction with its ends secured together by a screw or the like.

The drive discs 30, as shown in Fig. 3, may be located on the rods in position to serve as stops limiting the governor impelled movement of the rotor.

The companion pole pieces of the stator and rotor instead of being cut straight, as shown, may be cut on a taper to provide opposed conical faces, such construction having the advantage that lesser lateral movement of the rotor will be effective for efficient voltage control.

With the construction disclosed, substantially constant voltage can be maintained regardless of widely varying speed, thus to keep the lamps burning at full efficiency and to prevent burning out the lamps.

In the wiring diagram, the head lights and tail light are in separate circuits or in completely separate branches of the same overall circuit so that they are independently operative and so that if a lamp in one circuit becomes defective or is removed from the socket, this will not affect the lamp or lamps in the other circuit.

The generator, while fully efficient, is of small size and with the conical form of pole pieces, can be made of even smaller size than shown, an advantage where space is limited, as it may be on motorcycles, motor scooters or other vehicles to which the invention is particularly suited.

The various parts are of simple, durable construction and can be produced and assembled at low cost.

What is claimed is:

1. A generator of the character disclosed comprising stator and rotor elements, the rotor element being mounted on a sleeve, a shaft on which said sleeve is slidable, abutments fixed on the shaft at opposite ends of the rotor sleeve, rods extending between said abutments, said rotor having interpole spaces through which said rods extend and whereby said rotor will be driven upon rotation of the shaft, a spring interposed between one of the abutments and the rotor to shift the rotor into line with the stator, governor links pivoted to said abutment and links pivotally connecting the free ends of said governor links to the rotor.

2. A generator of the character disclosed comprising stator and rotor elements, the rotor element being mounted on a sleeve, a shaft on which said sleeve is slidable, abutments fixed on the shaft at opposite ends of the rotor sleeve, rods extending between said abutments, said rotor having interpole spaces through which said rods extend and whereby said rotor will be driven upon rotation of the shaft, a spring interposed between one of the abutments and the rotor to shift the rotor into line with the stator, governor links pivoted to said abutment and links pivotally connecting the free ends of said governor links to the rotor, said governor links being in the form of U-shaped yokes with their open ends pivoted to the abutment and having laterally offset hinge lugs at their closed ends connected with the pivoted links and whereby said yokes may be disposed with their side arms in alternating order to locate said offset pivot lugs in line across the center of the shaft.

CARL McDERMOTT.

REFERENCES CITED

The following references are of record in the file of this patent:

UNITED STATES PATENTS

| Number | Name | Date |
| --- | --- | --- |
| 697,963 | Apple | Apr. 22, 1902 |
| 1,271,441 | Dean | July 2, 1918 |
| 1,641,434 | Hunt | Sept. 6, 1927 |